Nov. 14, 1967     L. D. HOWSARE     3,352,183

DRILL JIGS

Filed Oct. 22, 1965     2 Sheets-Sheet 2

INVENTOR.
LEWIS D. HOWSARE

BY

ATTORNEY

United States Patent Office 3,352,183
Patented Nov. 14, 1967

3,352,183
DRILL JIGS
Lewis D. Howsare, 1201 Frank Ave.,
Jeannette, Pa. 15644
Filed Oct. 22, 1965, Ser. No. 500,644
11 Claims. (Cl. 77—62)

This invention relates to drill jigs, and more particularly to drill jigs of the type which rigidly clamp rod-like members relative to a drill for drilling openings therein or completely therethrough, at right angles to the longitudinal axis of the rod-like member.

Drill jigs of the type described are known in the prior art. These drill jigs have, however, numerous disadvantages which the drill jig of the present invention seeks to overcome. For example, many of the prior art drill jigs are very heavy and cumbersome and are, therefore, extremely difficult to position relative to a drill. Some are composed of such a relatively large number of parts, that the drill jig is unnecessarily complex and difficult to operate and use. Others are alleged to be constructed quickly releasable whereby the drilled rod member may be quickly replaced with a fresh rod member. These jigs are, however, readily clogged with chips and soon become extremely difficult to release. Finally, they are expensive to manufacture and therefore expensive to purchase.

Accordingly, as a primary object, the present invention seeks to provide an improved drill jig which does not have the numerous disadvantages described above.

Another object of the invention is to provide an improved drill jig which is quickly releasable whereby the drilled rod member may be quickly replaced with a fresh rod member.

Still another object of the invention is to provide an improved drill jig having a novel rod clamping arrangement which is not subject to clogging.

A further object of the invention is to provide an improved drill jig composed of a relatively small number of parts and which is extremely simple to operate.

Still another object of the invention is to provide an improved drill jig incorporating a readily replaceable drill guide for guiding a drill into engagement with the rod member.

Still another object of the invention is to provide an improved drill jig which is extremely lightweight and therefore readily and easily positionable relative to a drill.

Another object of the invention is to provide an improved drill jig which is relatively inexpensive to manufacture.

In accordance with the present invention, an improved drill jig is provided for drilling openings or through holes in rods, substantially perpendicular to the longitudinal axis of the rod. The drill jig comprises a housing secured to a base, and having slots formed in its side walls such that a rod member may extend through the slots in engagement with a bottom wall of the housing. Gauge means carried by the housing is provided for positioning each successive rod at the same preselected location relative to the drill.

To rigidly clamp the rod member to the housing, a clamping member is provided which resides within the housing and which has two intersecting grooves formed in its bottom face, each of a different size and configuration. The clamping member has a generally cylindrical outer surface whereby it is freely rotatable within the housing about the central axis of the housing whereby either one of the grooves thereon may be aligned with the rod member.

Novel means is provided for applying a force on the clamping member to rigidly clamp the rod member between the clamping member and the bottom wall of the housing. The clamping force is applied to the top of the clamping member, which is above the rod member. Hence, the chips created during drilling of the rod member cannot clog the force applying means. The force applying means is such that the rod member may be quickly clamped in position and, conversely, may be quickly released when desired.

Drill guide means, detachably carried by the clamping member, is provided for guiding the drill along the central axis of the housing. That is to say, the central axis of the drill is coincident with the central axis of the housing. The overall arrangement is such that the central axis of the drill is substantially perpendicular to the longitudinal axis of the rod member. The present drill jig is constructed so that the drill guide means may be readily installed and removed without disturbing the clamped condition of the rod member.

The above and other objects and advantages of the present invention will become apparent from the following detailed description by reference to the accompanying drawings, in which.

Figure 1:
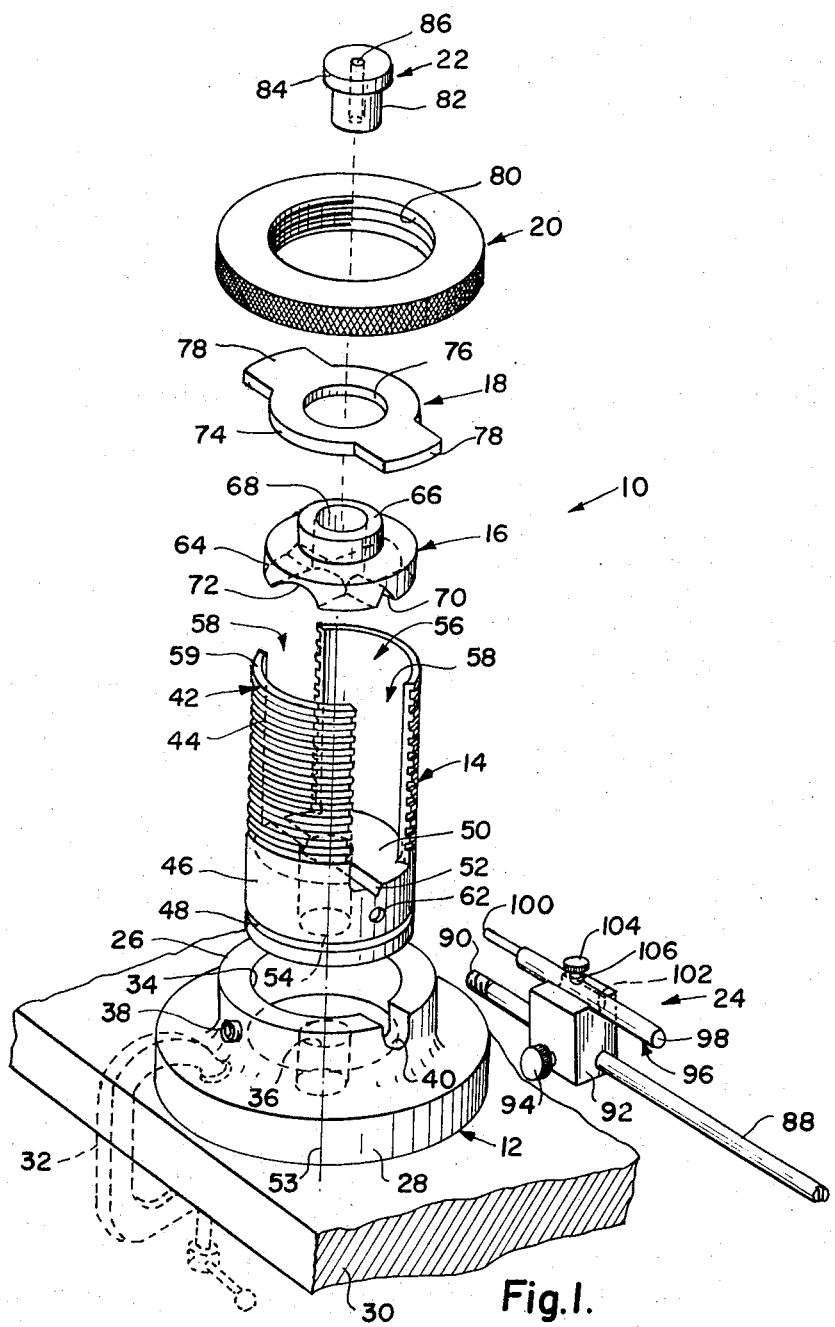
FIGURE 1 is an isometric view, in exploded form, illustrating the drill jig of the invention.
Figure 2:
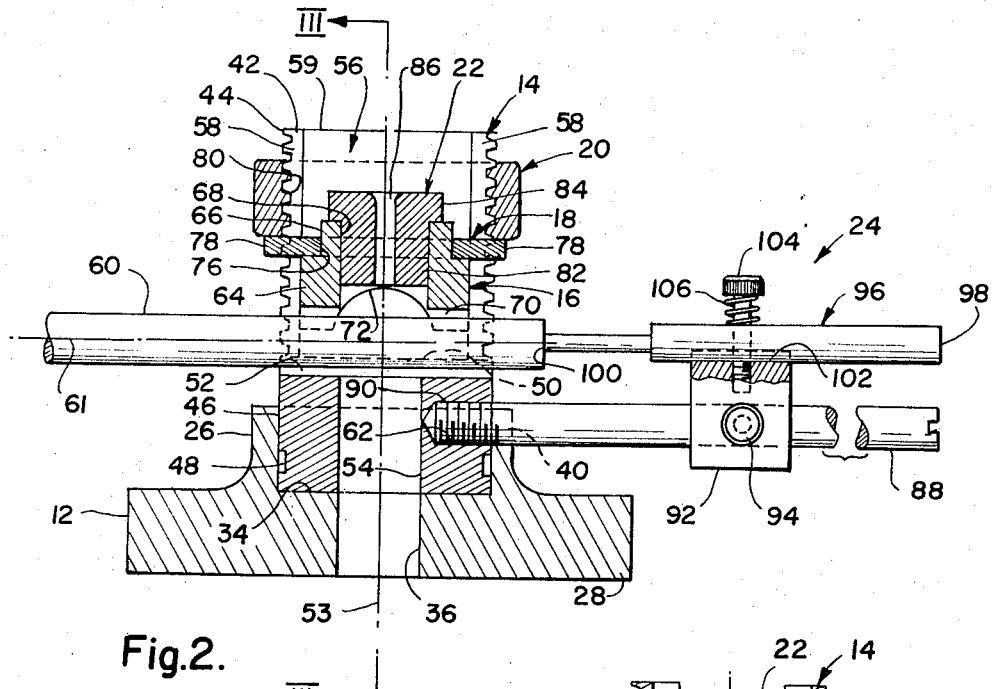
FIG. 2 is a cross-sectional view taken along the line II—II of FIG. 3.
Figure 3:
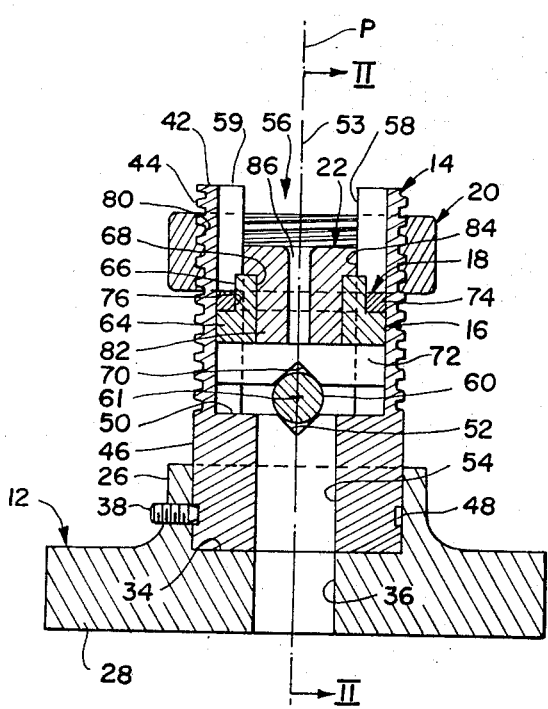
FIG. 3 is a cross-sectional view taken along the line III—III of FIG. 2.

Reference is now directed to FIGS. 1, 2 and 3 wherein there is illustrated a drill jig indicated generally by the numeral 10. FIG. 1 is an isometric exploded view of the drill jig 10 wherein its various components are shown in the order in which they are to be assembled. FIGS. 2 and 3 illustrate the drill jig 10 when assembled.

Basically, the drill jig 10 comprises a base 12, a housing 14, a clamping member 16, a pressure plate 18, a nut 20, a drill bushing 22, and a gauge attachment 24, these components being assembled as illustrated in FIGS. 2 and 3.

The base 12 has a generally T-shaped vertical cross-section comprising an annular hub 26 formed integrally with a plate member 28 adapted to rest on a support member 30 (FIG. 1), such as, the table of a drill press. As is conventional, the base 12 may be secured to the support member 30 by means of a C-clamp 32 shown in dotted outline in FIG. 1. The annular hub 26 provides a cylindrical bore 34 communicating with an opening 36 provided in the plate member 28. As will be described, set screw 38 serves to secure the housing 14 to the base 12, while the U-shaped recess 40 receives a support rod of the gauge attachment 24.

The housing 14 has a generally cup-shaped configuration, comprising a cylindrical side wall 44 and a relatively thick bottom wall 46 which fits into the cylindrical bore 34 of the base 12. An annular recess 48 is formed in the outer surface of the bottom wall 46 and receives the set screw 38 for securing the housing 14 to the base 12 as shown in FIG. 3.

The bottom wall 46 has an upper surface 50 in which is formed a groove 52, preferably in the form of a V, which extends across a diameter of the bottom wall 46. The groove 52 is preferably symmetrical about said diameter. The upper surface 50 as well as the groove 52 are substantially perpendicular to the central axis of the housing 14, indicated by the dash-dot line 53. An opening 54 extends vertically through the bottom wall 46 in alignment with the opening 36 of the base 12. The openings 36, 54 serve, among other things, to discharge chips which would otherwise accumulate within the housing 14.

The side walls 42 and the bottom wall 46 define a cylindrical cavity 56 into which the clamping member 16, the pressure plate 18 and the drill bushing 22 are received. The side wall 42 is provided with two aligned U-shaped slots 58 which extend from the level of the upper surface 50 through the upper edge 59 of the side wall 42. The U-shaped slots are preferably symmetrical about a vertical plane, indicated by the dash-dot line P in FIG. 3, which includes the central axis 53 and the aforesaid diameter about which the groove 52 is symmetrical. As will be seen, the U-shaped slots 58 are adapted to receive a rod member 60 which engages the groove 52. The rod member 60 will be so positioned that its longitudinal axis 61 is substantially perpendicular to the central axis 53 of the housing 14. The bottom wall 46 is additionally provided with a threaded aperture 62 positioned to receive the gauge attachment 24.

It is to be noted at this time that the term "rod" and phrases "rod member" and "rod-like member" are intended to describe elongated elements of various transverse configurations. Consequently, the cylindrical rod 60 is shown solely for the purposes of illustration.

Figure 4:
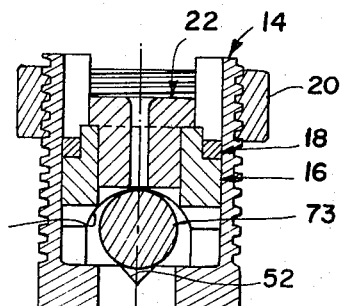
FIG. 4 is a fragmentary cross-sectional view, similar to FIG. 3 and taken along the plane of FIG. 3.

The clamping plate 16 is generally cylindrical having an enlarged lower end portion 64 adapted for close fitting engagement in the inner wall of the cavity 56 and an upper end portion 66 having a diameter which is less than the diameter of the lower end portion 64. A bore 68 extends completely through the clamping member 16 and is positioned in the clamping member 16 so that its central axis will be substantially coincident with the central axis 53 of the housing 14. The lower face of the clamping member 16 is provided with a V-shaped groove 70 and an arcuate groove 72. The grooves 70, 72 intersect and are preferably mutually perpendicular. The arrangement is such that the clamping member 16 is rotatable within the cavity 56 about the central axis 53 whereby either one of the grooves 70, 72 may be aligned, that is, disposed parallel with, the groove 52 of the housing 14. Consequently, the grooves 52 and 70 may be used to clamp the relatively small diameter rod 60 as shown in FIGS. 2 and 3 and of various cross sections while the grooves 52 and 72 may be used to clamp the relatively large diameter rod 73 as shown in FIG. 4, and of various cross sections. Furthermore, since the clamping member 16 is slidable axially of the cavity 56, its height above the upper surface 50 of the bottom wall 46 may be adjusted to conform substantially with the diameter of the rod member being clamped.

The pressure plate 18 comprises a washer-like portion 74 having a central opening 76 and oppositely extending flange members 78. The outer diameter of the washer-like portion 74 is slightly less than the inner diameter of the cavity 56. Consequently, the pressure plate 18 fits within the cavity 56 and is positioned so that the upper end portion 66 of the clamping member 16 projects upwardly through the central opening 76, as best shown in FIG. 3, and the flange members 78 project through the U-shaped slots 58, exteriorly of the housing 14 as best shown in FIG. 2. As will become apparent, the pressure plate 18 comprises means for transmitting a force to the clamping member 16 to rigidly clamp the rod member 60 between the clamping member 16 and the upper surface 50 of the bottom wall 46.

The nut 20 has internal threads 80 corresponding to the external threads 44 of the housing 14. The nut 20 is threaded onto the housing 14 into engagement with the flange members 78 (FIG. 2) and, therefore, comprises means for applying a force to the clamping member 16 to rigidly clamp a rod member between the clamping member 16 and the bottom wall 46. The outer surface of the nut 20 is preferably knurled so that the nut 20 may be easily turned by hand.

The drill bushing 22 is of conventional design comprising a cylindrical lower portion 82 of a diameter permitting the drill bushing 22 to be inserted into the central bore 68 of the clamping member 16, a radial flange 84 which engages the top of the clamping member 16, and a central opening 86 whose diameter is slightly greater than the diameter of a drill. As is conventional, the drill bushing 22 serves to guide a drill along the central axis 53 of the housing 14 and hence through the rod member 60. Specifically, the central axis of the drill will be coincident with the central axis 53 and therefore substantially perpendicular to the longitudinal axis 61 of the rod member 60. It is to be understood that a number of the drill bushings will be provided each having a central bore corresponding to a different size drill. Any one of these drill bushings may be substituted for the drill bushing 22 whereby various size openings or through holes may be drilled. It is to be noted that the drill bushing 22 may be easily and rapidly inserted or removed from the drill jig 10 by way if the open top of the housing 14. Furthermore, insertion or removal of the drill bushing 22 is accomplished without disturbing, for example, the clamped condition of the rod 60.

The gauge attachment 24 comprises an elongated rod 88 having a threaded end 90 which is threaded into the threaded aperture 62 of the housing 14 and received in the U-shaped recess 40 provided in the base 12. The U-shaped recess 40 permits the gauge attachment 24 to be installed even though the housing 14 is secured to the base 12. Adjustably supported on the rod 88 is a block 92 which is secured to the rod 88 by a fastener 94 at any desired location along the length of the rod 88. Carried by the block 92 is a stop rod 96 having large and small diameter ends 98, 100, respectively. The stop rod 96 is engaged in a shallow groove 102 formed in the top of the block 92 and is adjustably secured thereto by means of a fastener 104 and a spring 106 interposed between the head of the fastener 104 and the stop rod 96. The overall arrangement is such that the stop rod 96 may be pivoted about the fastener 104 to place either one of its ends 98, 100 in position for engagement by the ends of different diameter rods, such as the rod 60. The spring 106, of course, resiliently retains the stop rod 96 engaged wtih the shallow groove 102. This arrangement permits a rapid interchanging of the ends 98, 100 in the event larger or smaller diameter rods are next to be drilled.

Figure 5:
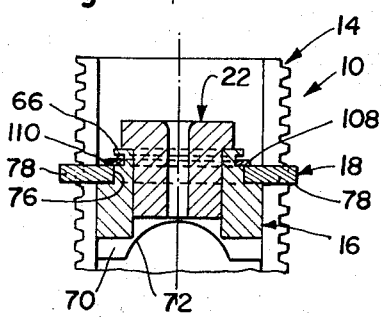
FIG. 5 is a fragmentary cross-sectional view, similar to FIG. 2 and taken along the plane of FIG. 2, illustrating an alternative arrangement of the drill jig of the invention.

An alternative arrangement of the drill jig 10 is illustrated in FIG. 5. In this instance, the clamping member 16 is connected to the pressure plate 18, for example, by means of a snap ring 108 residing in an annular groove 110 formed in the upper end portion 66 of the clamping member 16. The connection is such that the clamping member 16 is freely rotatable in the central opening 76 of the pressure plate 18 whereby either one of the grooves 70, 72 may be aligned with the rod being clamped. However, the clamping member 16 may be easily raised for insertion of a new rod, by grasping the flange members 78 of the pressure plate 18. Furthermore, removal of the clamping member 16 is also facilitated.

Operation of the drill jig 10 will now be described with reference to FIGS. 2 and 3. To remove the rod 60 after having been drilled, the nut 20 is turned counter-clockwise (assuming right-hand threads 44) to loosen the clamping member 16. The rod 60 is removed and a fresh rod is inserted through the left-hand U-shaped slot 58 (as viewed in FIG. 2) until its end engages the stop rod 96. Rotating the nut 20 in a clockwise direction results in aligning the fresh rod in the grooves 52, 70 and clamping thereof. The rod is now positioned to be drilled. It should now be evident that the extremely simple operation of the drill jig 10 permits a succession of rods to be drilled in a rapid manner. The rapid operation of the drill jig 10 can, of course, be attributed to the manner in which the rods are clamped. Furthermore, inasmuch as the clamping mechanism resides outside of the housing 14, it is not subjected to clogging as in the case of most prior art drill jigs. Consequently, the quick release and clamp features of the drill jig 10 are retained despite long use of the jig 10.

Although the invention has been shown in connection with certain specific embodiments, it will be readily apparent to those skilled in the art that various changes in form and arrangement of parts to suit requirements may be made without departing from the spirit and scope of the invention.

I claim as my invention:

1. A drill jig for rigidly supporting rod-like members with the central axis thereof substantially perpendicular to the central axis of a drill, comprising a base; a housing projecting from said base, having a central axis and side walls and a bottom wall adjacent said base, cooperating to define a cavity, said side walls having slots formed therein which terminate adjacent said bottom wall; a clamping member disposed within said cavity and having at least one groove formed in that face thereof adjacent said bottom wall, said clamping member and said groove cooperating with said bottom wall to rigidly clamp a rod-like member extended through said slots with the longitudinal axis thereof substantially perpendicular to said central axis; flange members projecting from said clamping member into said slots; means for applying a force on that face of said flanges remote from said rod-like member to affect rigid clamping of said rod-like member between said clamping member and said bottom wall; and means detachably carried by said clamping member for guiding a drill along said central axis and hence through the longitudinal axis of said rod-like member.

2. The drill jig as defined in claim 1 wherein said bottom wall is provided with a second groove which cooperates with said groove on said clamping member.

3. The drill jig as defined in claim 1 wherein said clamping member is provided with two intersecting grooves, one of which is V-shaped and the other of which is semicylindrical.

4. The drill jig as defined in claim 1 wherein said flange members are integral with and extend from a washer-like member engaged with said clamping member, said clamping member and said washer-like member being separate elements.

5. The drill jig as defined in claim 4 including means for connecting said washer-like member to said clamping member.

6. The drill jig as defined in claim 4 wherein said clamping member and said housing comprise cylindrical members, said clamping member having two intersecting grooves formed therein one of which is V-shaped and the other of which is semicylindrical, said clamping member being freely rotatable in said cavity about said central axis to position one of said two intersecting grooves in alignment with said slots.

7. The drill jig as defined in claim 1 wherein one end of said slots is flush with the level of said bottom wall, said slots extending from said bottom wall through the upper edge of said housing.

8. The drill jig as defined in claim 1 wherein said housing is cylindrical in shape having external threads provided thereon and said flange members project exteriorly of said housing, and wherein said force applying means comprises a nut threaded onto said housing into engagement with said flange members.

9. The drill jig as defined in claim 1 wherein said bottom wall and said base have openings aligned along said central axis.

10. The drill jig as defined in claim 1 wherein said drill guiding means comprises a drill bushing insertable through the open end of said housing, said clamping member having a bore receiving said drill bushing, said drill bushing being insertable into and removable from said housing without disturbing the rigidly clamping condition of the rod-like member.

11. The combination of claim 1 including gauge means engageable by the end of said rod-like member for positioning the same relative to the drill, said gauge means comprising a block, means for adjustably supporting said block relative to said housing, a stop rod having different diameter end portions each positionable for engagement by the end of said rod-like member, and means for resiliently and pivotally connecting said stop rod to said block parallel with the longitudinal axis of said rod-like member.

References Cited

FOREIGN PATENTS 164,228  6/1921  Great Britain.
551,448  2/1943  Great Britain.

FRANCIS S. HUSAR, *Primary Examiner.*